(12) United States Patent
Kowalski

(10) Patent No.: US 8,380,749 B2
(45) Date of Patent: Feb. 19, 2013

(54) MDR FEDERATION FACILITY FOR CMDBF

(75) Inventor: Vincent Joseph Kowalski, Houston, TX (US)

(73) Assignee: BMC Software, Inc., Houston, TX (US)

( * ) Notice: Subject to any disclaimer, the term of this patent is extended or adjusted under 35 U.S.C. 154(b) by 477 days.

(21) Appl. No.: 12/545,753

(22) Filed: Aug. 21, 2009

(65) Prior Publication Data

US 2010/0185658 A1 Jul. 22, 2010

Related U.S. Application Data

(60) Provisional application No. 61/144,683, filed on Jan. 14, 2009.

(51) Int. Cl.
*G06F 17/00* (2006.01)
(52) U.S. Cl. ........ 707/802; 707/791; 707/793; 707/795; 707/825; 707/781
(58) Field of Classification Search .................. 707/791, 707/793, 795, 802, 825, 781
See application file for complete search history.

(56) References Cited

U.S. PATENT DOCUMENTS

| | | | | |
|---|---|---|---|---|
| 7,814,142 B2* | 10/2010 | Mamou et al. | ................ | 709/203 |
| 7,814,470 B2* | 10/2010 | Mamou et al. | ................ | 717/162 |
| 7,962,512 B1* | 6/2011 | Sholtis et al. | ................ | 707/777 |
| 2008/0134176 A1* | 6/2008 | Fitzgerald et al. | ................ | 718/1 |

OTHER PUBLICATIONS

Johnson et al.; "Reconciliation Taxonomy (RTx): Preliminary Draft Version 0.81;" May 26, 2009; 21 pages.
Carlisle et al.; "Configuration Management Database (CMDB) Federation Specification: Version 1.0.0;" Jun. 22, 2009; 73 pages.

* cited by examiner

*Primary Examiner* — Sana Al Hashemi

(57) ABSTRACT

This disclosure relates generally to the field of federated configuration management databases (CMDBs). To claim compliance with the CMDBf Standard ("the Standard"), a CMDB implementation must provide working and interoperable implementations of the interfaces defined in the Standard. To make a working implementation, certain non-obvious features are required that are not addressed by the Standard. Among these requirements are: registering management data repositories (MDRs) so that they can be federated; managing/maintaining the list of federated MDRs; querying an MDR for its Data Model; using such MDR Data Models to define mappings of one or more attributes from the MDR data model to one or more attributes of one or more of the CMDB's data models; identifying attributes and defining rules to be used when reconciliation is performed; and managing as well as storing data representative of those mappings. This disclosure addresses these and other deficiencies.

27 Claims, 9 Drawing Sheets

"Mapping Workflow"

"Federated Query Workflow"

MDR FEDERATION FACILITY FOR CMDBF

CROSS-REFERENCE TO RELATED APPLICATIONS

This application is related to provisional U.S. patent application Ser. No. 61/144,683 filed on Jan. 14, 2009, entitled "A CMDB Federation Method and Management System" by Govindarajan Rangarajan and Jiani Chen, which is hereby incorporated by reference in its entirety.

BACKGROUND

This disclosure relates generally to the field of ITIL®-based (Information Technology Infrastructure Library) Configuration Management Databases (CMDBs). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for Enterprise Management Software. In enterprise systems management, data about IT business entities such as servers and applications are generally spread across several repositories, known as Management Data Repositories (MDRs). This data is made available to software applications through various standard and non-standard mechanisms such as Structured Query Language (SQL) and/or other proprietary programming interfaces.

The usefulness of these CMDBs is dependent on the quality, reliability and security of the data stored in them. A CMDB often contains data about managed resources known as Configuration Items (CIs). ITIL version 3 defines a CI as: "Any Component that needs to be managed in order to deliver an IT Service. Information about each CI is recorded in a Configuration Record within the Configuration Management System and is maintained throughout its Lifecycle by Configuration Management. CIs are under the control of Change Management. CIs typically include IT Services, hardware, software, buildings, people, and formal documentation such as Process documentation and [Service Level Agreements]."

The CMDB serves as a point of integration between various IT management processes (See FIG. 1). Data federation is the combining of data from various data sources into one single virtual data source or data service. The data can then be accessed, managed and viewed as if it were part of a single system. Data from multiple sources often needs to be managed directly or by reference in commercial CMDBs. Thus, there was a need to create a standard for federating the data from various MDRs and/or CMDBs into a single view that appears seamless and integrated to the end-user. This standard, known as the CMDB Federation, or CMDBf, Standard was recently adopted by the Distributed Management Task Force (DMTF). A copy of the CMDBf 1.0.0 Specification (DMTF Document Number: DSP0252) is hereby incorporated by reference in its entirety.

Some of the goals of CMDBf include: enabling a variety of data consumers to access a federation of management data through a standard access interface; enabling a variety of data providers to participate in a federation of management data through a standard provider interface; and providing an approach for reconciling and combining different information about the same resources.

At a high level, the CMDBf Standard defines the following features: a Web Services Query Interface that is intended for querying Configuration Items (CIs) distributed across a set of Federated MDRs; a Data Model that defines containers for Federated CI's (items in this data model are organized into simple flat record structures); a MDR Web-Services Query Interface for plugging MDRs into the Federated CMDB; Push-Mode and Pull-Mode alternative architectures for MDR Federation; and a Registration Web Services Interface for Push-Mode Federation.

However, a real-world implementation of CMDBf will need to have a number of features implemented that are not directly addressed by the CMDBf Standard. These features include: management of the MDR endpoints using a Universal Description, Discovery and Integration (UDDI) registry; querying of the MDR Data Models; and definition and management of mappings from MDR Data Models to CMDB Data Models. This disclosure presents solutions to these problems, along with the ability to bring CIs that are stored in MDRs under the management of a federating CMDB.

SUMMARY

This disclosure relates generally to the field of federated CMDBs. To claim compliance with the CMDBf Standard ("the Standard"), a federated CMDB implementation must provide working and interoperable implementations of the interfaces defined in the Standard. To make a working implementation, certain non-obvious features are required that are not addressed by the Standard. Among these requirements are: registering MDRs so that they can be federated; managing/maintaining the list of federated MDRs; querying an MDR for its Data Model; using such MDR Data Models to define mappings of one or more attributes from the MDR data model to one or more attributes of one or more of the CMDB's data models; identifying attributes and defining rules to be used when reconciliation is performed; and managing—as well as storing—data representative of those mappings.

In one embodiment, a computer system comprising a programmable control device is programmed to perform a federated MDR query method for a CMDB, the method comprising: receiving interface information for one or more registered MDR services from a computer system possessing a UDDI registry; querying one or more of the registered MDR services for their respective MDR data models; storing the queried MDR data models in a first memory; and, for each of the queried MDR data models, mapping one or more attributes from an entity in the MDR data model to one or more attributes of an entity or entities in the CMDB's federated data model.

In another embodiment, the computer system is further programmed to receive a query from a client application; federate data from one or more MDRs in response to the received query; and return a federated results set to the client application.

In yet another embodiment, the instructions for carrying out the above described methods are tangibly embodied on a computer useable memory medium.

In yet another embodiment, a computer network is utilized to carry out the above described methods.

DETAILED DESCRIPTION

Methods and systems to enable key architectural gaps of the CMDBf Standard are described herein. Through a detailed investigation, it has been non-obviously determined by the inventor that the systems and methods disclosed herein solve the architectural gaps left open by the CMDBf Standard, using a well-designed, generic approach that better realizes the benefits of CMDB Federation. This disclosure provides the opportunity for CIs stored outside the Federated CMDB (e.g., in external MDRs) to participate in the Federated CMDB as if they were part of the Federated CMDB itself. This transferring of data from the native data stores in which it resides to a Federated CMDB can be done transparently and without added effort or expense on the part of the CMDB provider or the end-users of the system itself.

Figure 1:
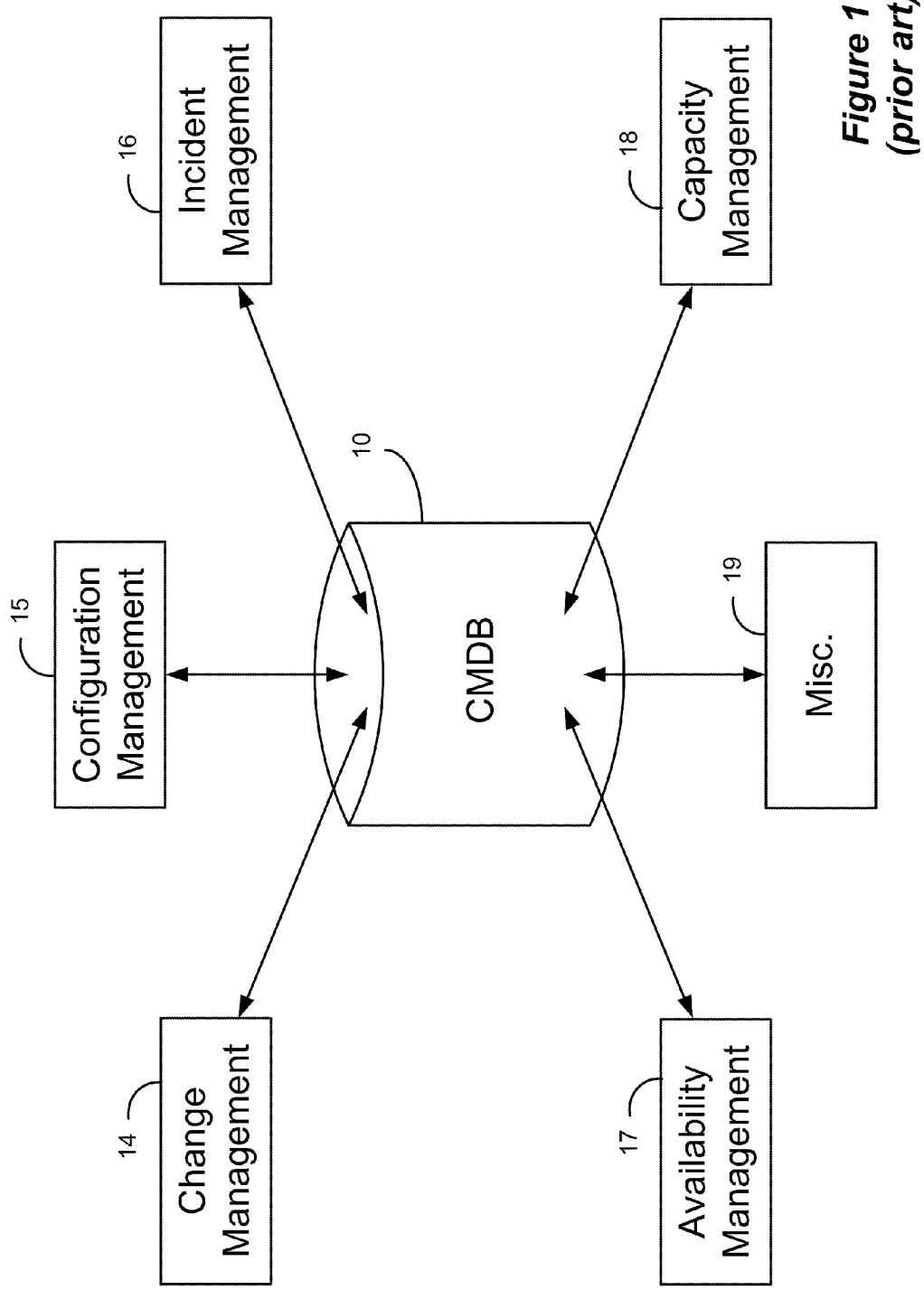
FIG. 1 shows a CMDB serving as a point of integration between various IT management processes.

As mentioned above, the usefulness of CMDBs is dependent on the quality, reliability and security of the data stored in them. A CMDB often contains data about managed resources like computer systems and application software, process artifacts like incident and change records, and relationships among them. In FIG. 1, the CMDB 10 serves as a point of integration between various IT management processes (Elements 14-19). Data from multiple sources often needs to be managed directly or by reference in commercial CMDBs. These IT management processes may include, for example, Change Management 14, Configuration Management 15, Incident Management 16, Availability Management 17, Capacity Management 18, and any number of Miscellaneous IT Processes 19 that an enterprise may find it useful to monitor.

In practice, the goal of federating data is often not met because the various management data are scattered across repositories that are not well integrated or coordinated. There was previously no standard for providers of MDRs to plug their data into a federating scheme. This problem existed both for individual vendors trying to integrate with multiple CMDBs and for customers who needed to integrate data from multiple vendors' MDRs. Thus, the CMDBf Standard was adopted by the DMTF.

Figure 2:
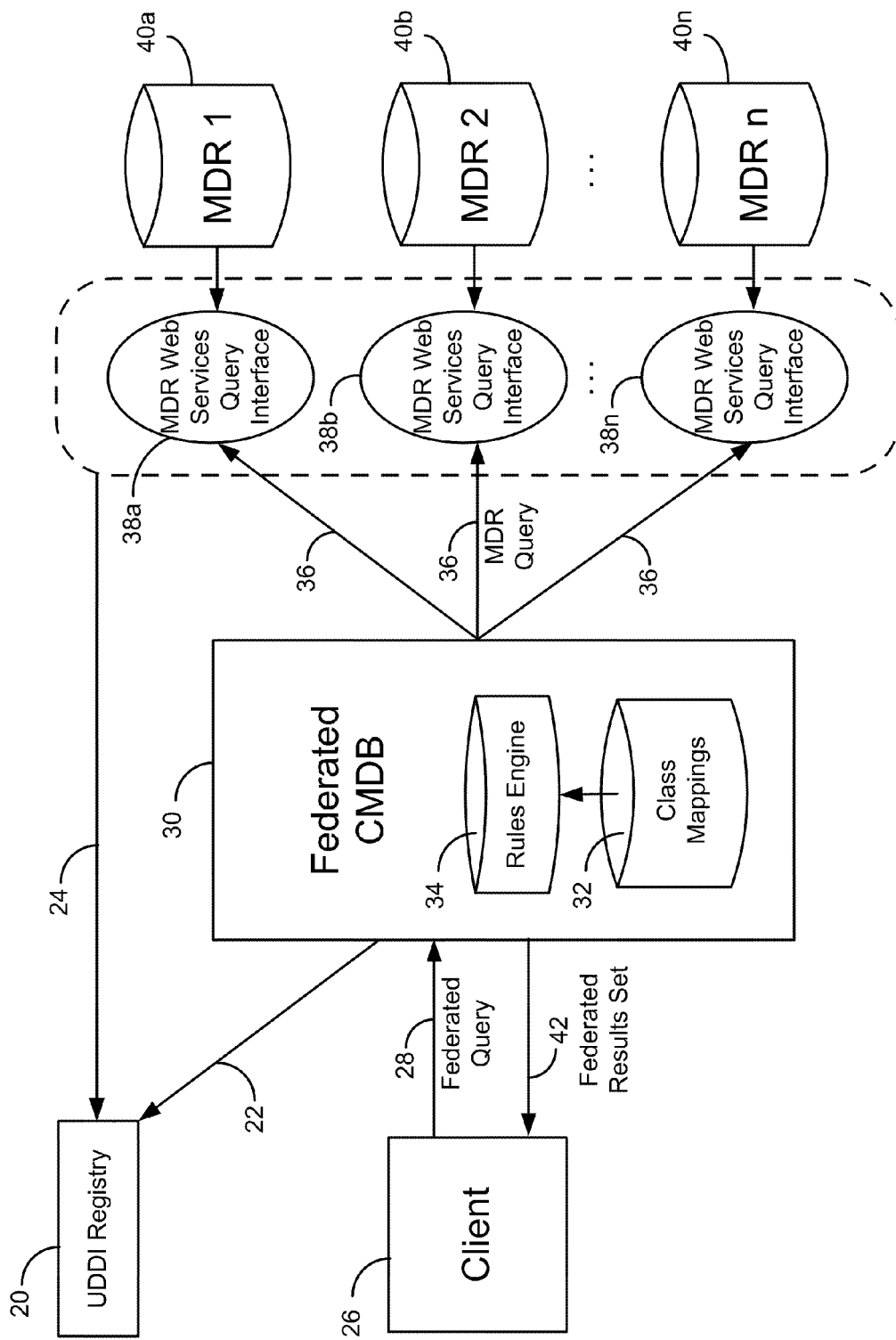
FIG. 2 shows, in block diagram form, the architecture of a federated CMDB.

FIG. 2 shows the architecture of a system implementing the CMDBf Standard, i.e., a federated CMDB model, in accordance with one embodiment of the invention disclosed herein. First, a UDDI registry 20, along with a CMDB 30, are installed and brought online. At this point, there are no MDRs associated with the CMDB 30 yet. Next, MDRs 1 through n (Elements 40a-40n) and their respective MDR services, e.g., MDR web service query interfaces 38a-38n, are brought on stream and registered in the UDDI Registry 20. This occurs via the UDDI publish operation 24, as defined in the UDDI V3.0.2 Standard, which is hereby incorporated by reference in its entirety. The CMDB 30 may subsequently query the UDDI registry for a listing of MDRs via process 22.

Next, the CMDB 30 uses one or more MDR services with a standard interface, e.g., the CMDBf MDR Meta Data Model Query Interface 36 to query across the set of MDRs 40 that are potentially to be federated. The MDR Meta Data Model Query Interface 36 may be able to perform the following—or any number of other—operations: listing all registered MDRs; listing all classes in a given MDR; listing all relationships in a given MDR; getting all the attributes for a given class; getting all the attributes for a given relationship; getting the source and target classes for a relationship; getting the definition of a given attribute; and determining inheritance in the data model hierarchy (i.e., subclasses and superclasses). Based on the information returned from the MDR Meta Data Model Query Interface 36, an administrator can define class mappings 32 to known (or newly created) class definitions in the Federated CMDB data model (See FIG. 5).

Subsequently, when a so-called Federated Query 28 is posed to the Federated CMDB 30 by, for example, a client application 26, it is appropriately delegated to the MDRs 40 based on the defined class mappings 32 that are applied by a rules engine 34 in the Federated CMDB 30. The result set is received from the MDRs 40, thus creating a Federated Results Set 42. Federated Results Set 42 presents a single and unified result set to the user (e.g., client 26), seamlessly integrating the CIs found in the various MDRs 40 into a single viewable result set. The query itself may also be written by an administrator or an end-user, for example.

As is explained in version 1.0.0 of the CMDBf Specification document, the Query Service can be provided by both MDRs and federating CMDBs. It provides a way to access the items and relationships that the provider (MDR or federating CMDB) has access to, whether this provider actually holds the data or federates the source of the data. The Query Service contains a GraphQuery operation that can be used for anything from a simple instance query to a much more complex topological query.

A GraphQuery request describes the items and relationships of interest in the form of a graph. Constraints can be applied to the nodes (items) and edges (relationships) in that graph to further refine them. The GraphQuery response contains the items and relationships that, through their combination, compose a graph that satisfies the constraints of the graph in the query. The subsequent subclauses provide a more complete description of the request and response messages for the GraphQuery operation.

There are generally two operational modes available to a CMDB attempting to federate data from various MDR sources: "push mode" federation and "pull mode" federation. A Federating CMDB generally uses one mode or the other, but may also be configured to use both modes. In push mode, the MDR initiates the federation. That is, the MDR invokes the Registration service at the appropriate time (e.g., when relevant data is added, updated or deleted) to register items within the MDR requiring federation at the Federating CMDB. Depending on the extent of the data types present in the MDR, the registered data may be limited to identification data, or it may include many other properties that describe the item or relationship state. In a "push-based" system, there may need to be some configuration information in a known place, i.e., a configuration property, that provides the endpoint of the registry to the MDR Services so that the process of receiving the plurality of registered MDR services may be initiated by the computer system possessing the MDR Web Services Query Interface.

In pull mode, on the other hand, the Federating CMDB initiates the federation. That is, typically, an administrator configures the Federating CMDB by selecting the MDR data types that will be federated. The Federating CMDB queries MDRs for instances of this data. Depending on the implementation, the Federating CMDB may pass through queries to MDRs without maintaining any state, or it may cache some set of MDR data, such as the data used to identify items and relationships, before registering items within the MDRs.

Figure 3:
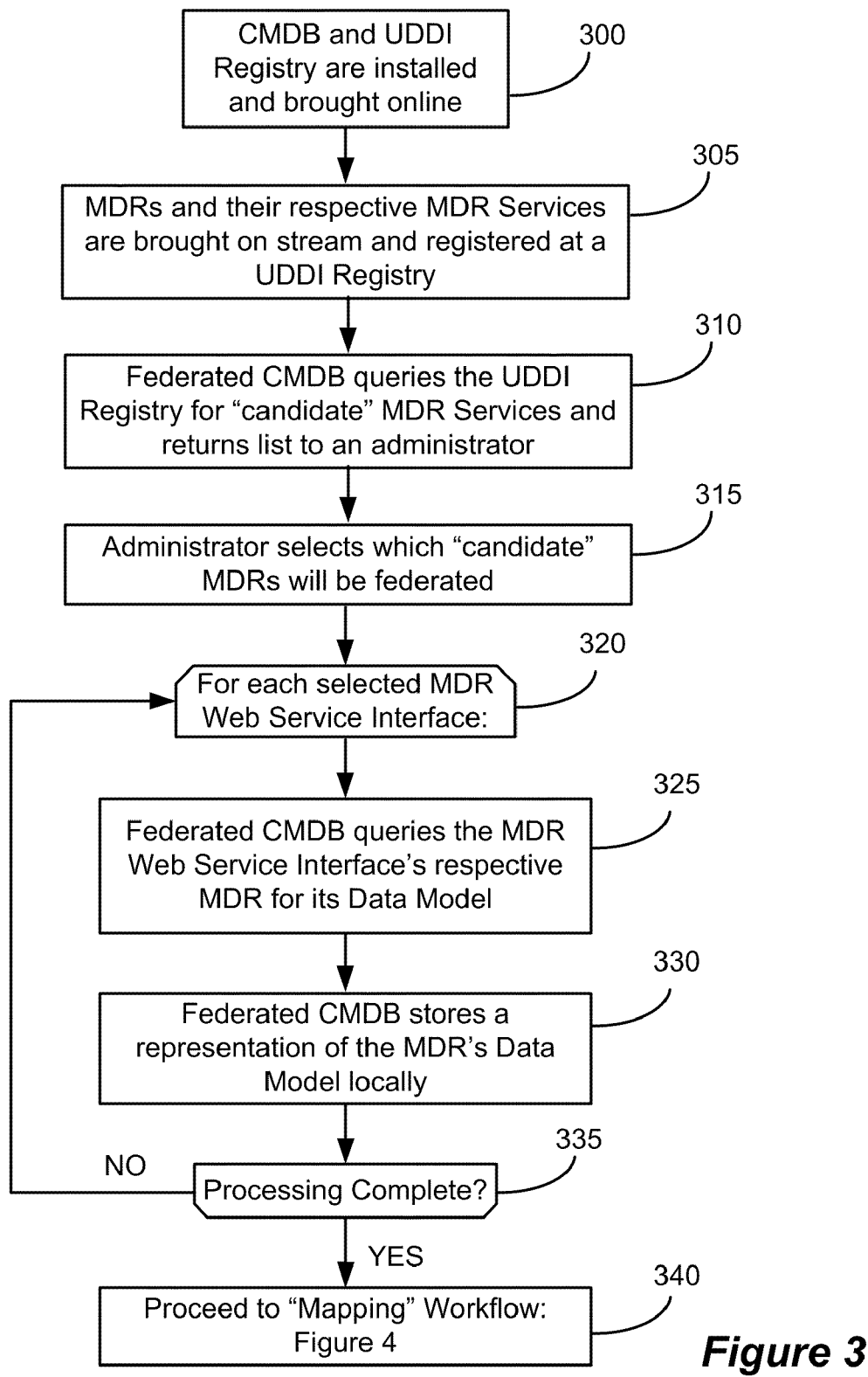
FIG. 3 shows, in flowchart form, an exemplary process for querying MDRs for their respective Data Models based on an embodiment disclosed herein.

FIG. 3 is a flow chart illustrating one use of the MDR Meta Data Model Query Interface 36 to carry out an MDR Meta Data Model query. One point of variation in any system is the Data Model or Models supported for record types at a given MDR. Prior to sending register or query messages to an MDR, it may be necessary to inspect the capabilities and data models supported by that particular MDR.

Looking at FIG. 3, first, the CMDB and UDDI Registry are installed and brought online 300. Next, the MDRs and their respective MDR Services are brought on stream and registered in the UDDI Registry 305. The Federated CMDB may then query the UDDI registry for "candidate" MDR services and receive a list to be reviewed by an administrator 310. The administrator can then select which "candidate" MDRs will be federated 315. For each selected MDR Service 320 with a CMDBf compliant query interface, the Federated CMDB queries the MDR Service for its respective MDR's Data Model 325. The MDR's Data Model may consist of, for example: a list of all class definitions, relationships, attributes, and hierarchy information for the MDR, or some subset thereof. Then, the Federated CMDB stores a representation of the MDR's Data Model 330 locally. When the processing is complete 335, the system is ready for an administrator or other end-user to proceed to the "Mapping" workflow 340, which is described in more detail in relation to FIG. 4.

Figure 4:
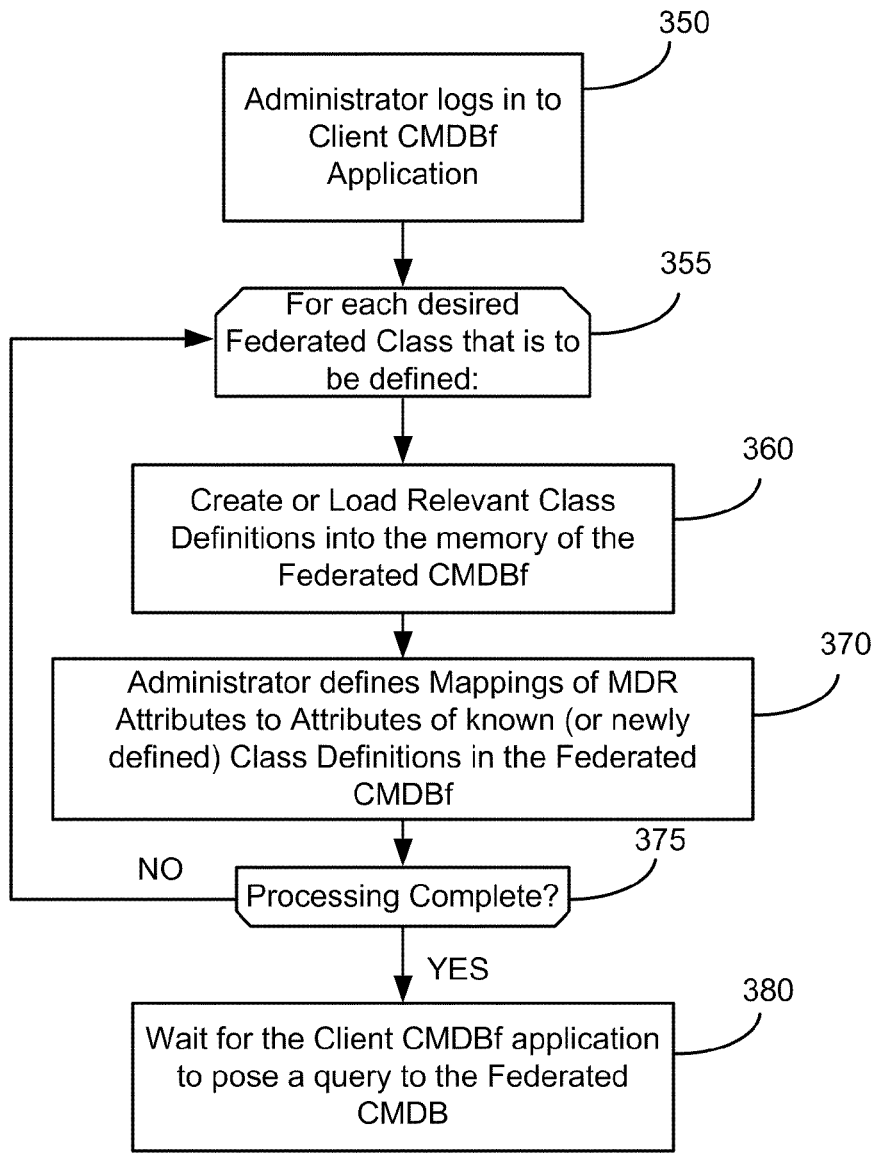
FIG. 4 shows, in flowchart form, an exemplary process for mapping MDR attributes to attributes of class definitions in the federated CMDB based on an embodiment disclosed herein.

FIG. 4 is a flow chart illustrating, in greater detail, the use of an Administrative Mapping Tool in accordance with one embodiment of the present invention. First, the Administrator or other system end-user logs in to the Client CMDBf Application 350. Then, for each Federated Class that the Administrator or end-user desires to define 355, the relevant CI class definition is retrieved and loaded into memory 360. At this point, the Administrator may use an Administrator CMDBf Mapping Tool, for example a Windows-based tool with a graphical user interface (UI) that allows him or her to define mappings of MDR attributes to attributes of known (or newly defined) class definitions in the Federated CMDBf (See FIG. 5). When this processing is complete 375, the system is prepared for the client CMDBf application to pose a query to the Federated CMDB 380.

Figure 5:
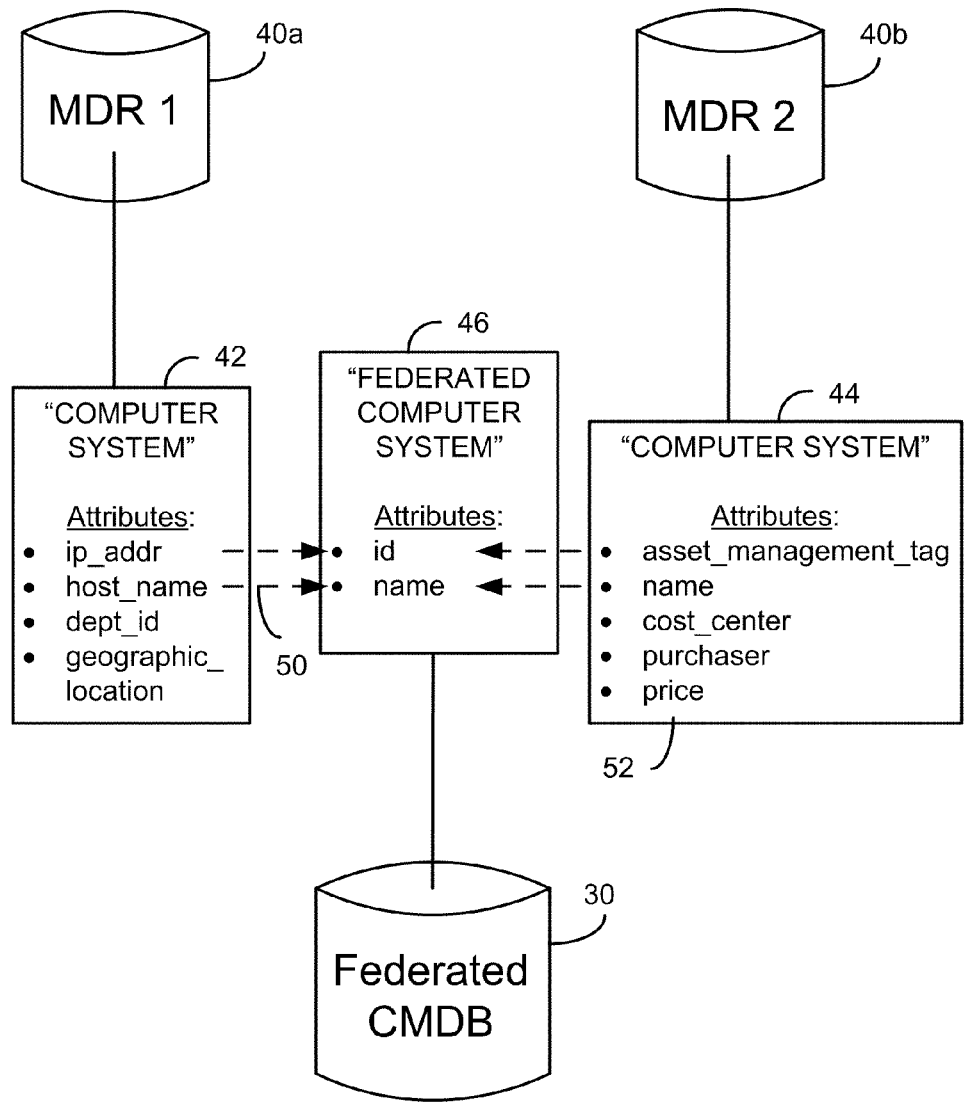
FIG. 5 shows an example of mapping attributes from federated MDRs to a known class definition in the federated CMDB based on an embodiment disclosed herein.

FIG. 5 shows an exemplary mapping process that may be carried out by a user or Administrator of the Federated CMDB described herein according to one embodiment of the present invention. In this Figure, the user or Administrator is attempting to create a federation of MDRs 1 and 2 (e.g., Elements 40*a* and 40*b*, respectively). Specifically, MDRs 1 40*a* and 2 40*b* each have a "COMPUTER SYSTEM" class (Elements 42 and 44, respectively) which describes a certain type of CI that they monitor—in this example, a computer system. The class "FEDERATED COMPUTER SYSTEM" 46 will either already exist in the Federated CMDB 30 or have been custom-defined and newly created by the Administrator or other end-user prior to the mapping process. Each of the classes 42, 44, and 46, will have various attributes 52 that describe the CIs that the classes represent. In the case of MDR 1 40*a* in the example, the MDR is a network management system, and its "COMPUTER SYSTEM" class has: "ip_addr" as its identifying property, as well as "host_name," "dept_id," and "geographical_location." In the case of MDR 2 40*b* in the example, the MDR is a asset management system, and its "COMPUTER SYSTEM" class has: "_asset management_tag" as its identifying property, as well as "name," "cost_center," "purchaser," and "price." The attributes of the "FEDERATED COMPUTER SYSTEM" class in the Federated CMDB 30 in this example are "id" and "name."

Because the Administrator or other user of the system will have some knowledge of the MDRs as well as the federated classes, he or she will be able to use the Administrator CMDBf Mapping Tool's UI to create a mapping 50 of as many of the attributes in the MDR classes (42 and 44) as are desired to attributes 52 of the federated class (46). In the example shown in FIG. 5, "ip_addr" from MDR 1 40*a* and "asset management_tag" from MDR 2 40*b* map to the federated class's "id" attribute, whereas "host_name" from MDR 1 40*a* and "name" from MDR 2 40*b* map to the federated class's "name" attribute.

MDR to federated class mappings may be stored and expressed in XML or any other suitable mark-up language. The XML syntax for a given MDR-to-Federated Class mapping expresses the classes that are involved in the mapping as well as which attributes map to one another. Transformations, data type conversions and the like may be performed or implied by these mappings. It should be noted that more than one class of CI from each MDR may be mapped to a single federated class. Likewise, a combination of more than one attribute may be mapped to a single attribute in a federated class, and there may be attributes in MDR classes that are not mapped to any particular federated class attribute. The degree of mapping is determined entirely by the enterprise's overall design and needs.

Figure 6:
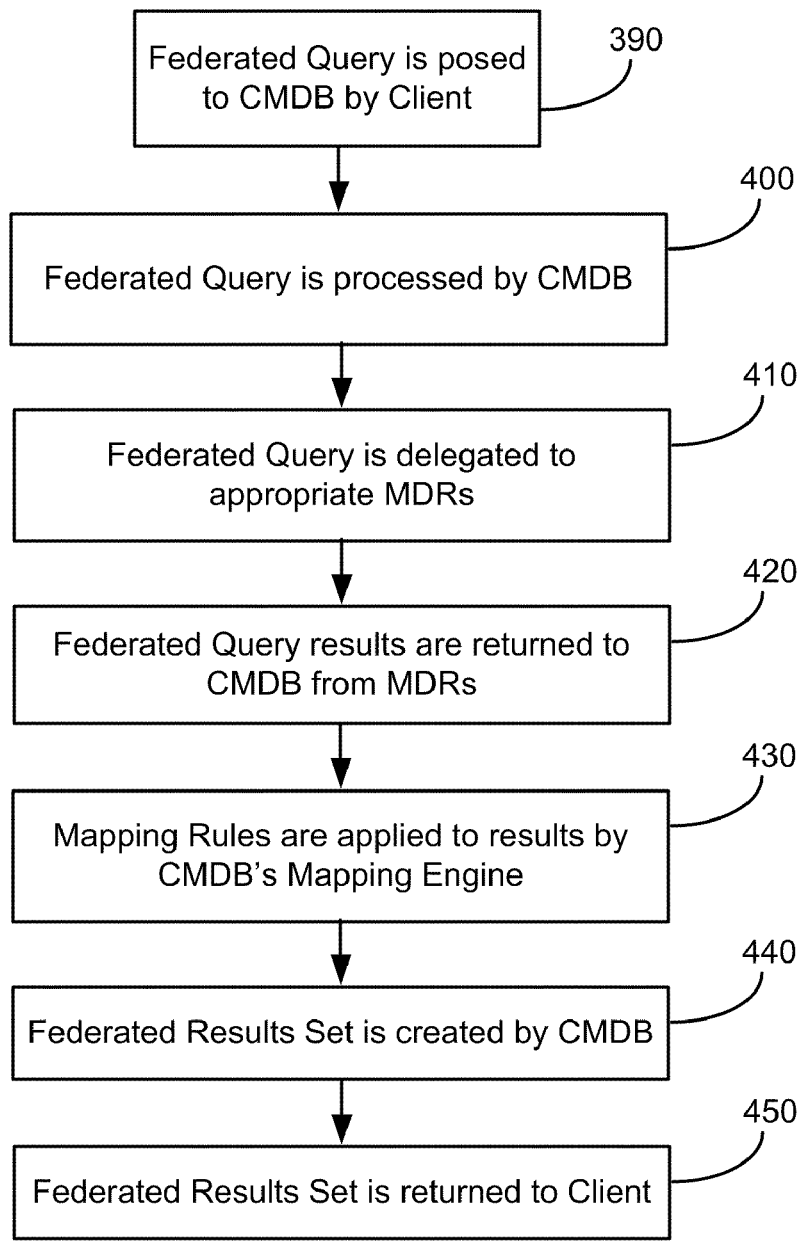
FIG. 6 shows, in flowchart form, an exemplary process for querying federated MDRs based on an embodiment disclosed herein.

The result of this mapping process is that a Federated Query may be posed to the CMDB by an administrator or user, one embodiment of which is shown in flowchart form in FIG. 6. When a Federated Query 28 is posed to the Federated CMDB 30 (Step 390), the query is processed by the Federated CMDB 30 (Step 400) and then delegated to the appropriate MDRs 40 (Step 410). When the query results from each MDR 40 are returned to the CMDB 30 (Step 420), the appropriate mapping rules 32 are applied by Rules Engine 34 (Step 430), and a Federated Results Set 42 is created (Step 440) and returned to the client 26 (Step 450).

Rules Engine 34 may comprise three essential components: a Rules Editing/Assertion module; a Rules Interpretation module; and a Rules Application module. In general, rules are input as XML definitions. These rules are then interpreted by the Rules Engine 34 to determine what actions they imply. The rules are then applied as a post processing step to a Federated Query 28.

Figure 7:
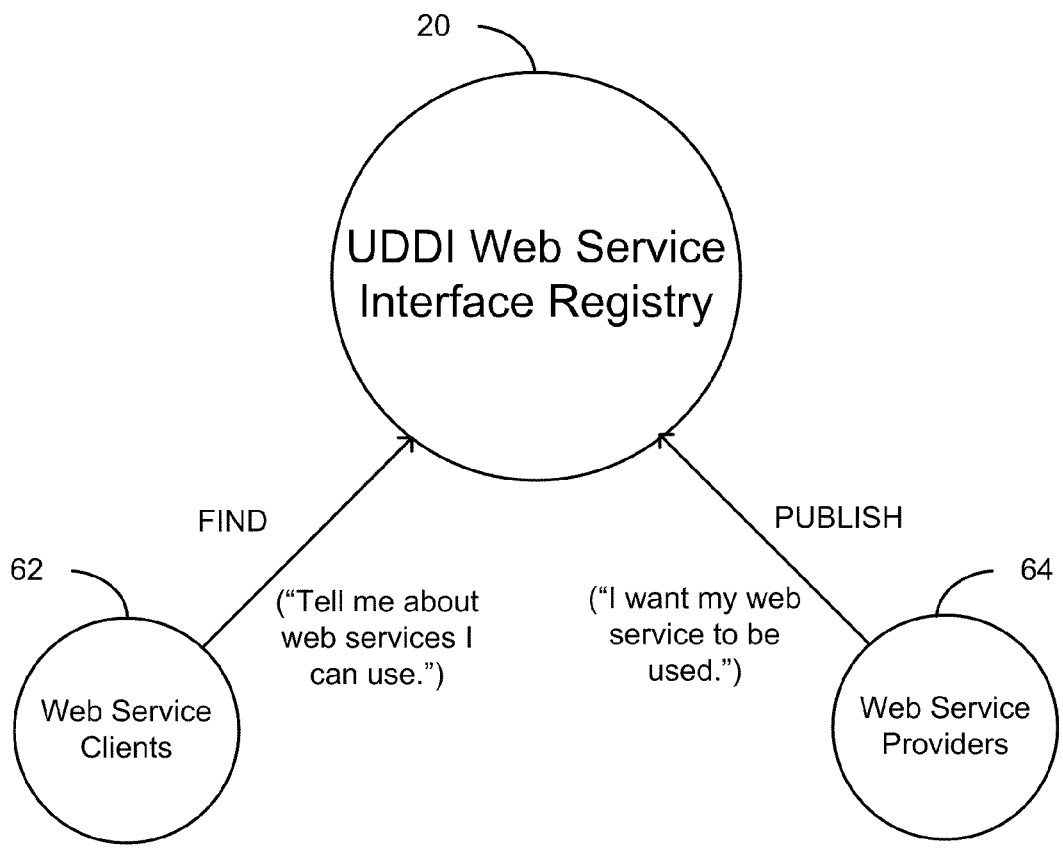
FIG. 7 shows an example of an UDDI Registry.

FIG. 7 shows the basic architecture of the UDDI Web Services Registry in one embodiment of the present invention. The UDDI Web Service Interface Registry 20 serves as a repository where the various MDR web service interfaces 38 can publish their interfaces upon coming on stream so that the Federated CMDB 30 can look up—in a single location—all the interfaces of MDRs whose data it may potentially want to federate. Web Service Clients 62 are those applications, e.g., a Federated CMDB 30, that are looking to find web services that they can use. Web Service Providers 64 are those services, e.g., an interface to an MDR, that publish their interfaces with the UDDI Web Service Interface Registry 20 so that they may be used. Providing for a single repository where web service interfaces are published allows the Federated CMDB to generate a list that it can iterate over in order to query each registered MDR Service for its respective Meta Data Model, as was explained in relation to Steps 320-335 of FIG. 3.

Figure 8:
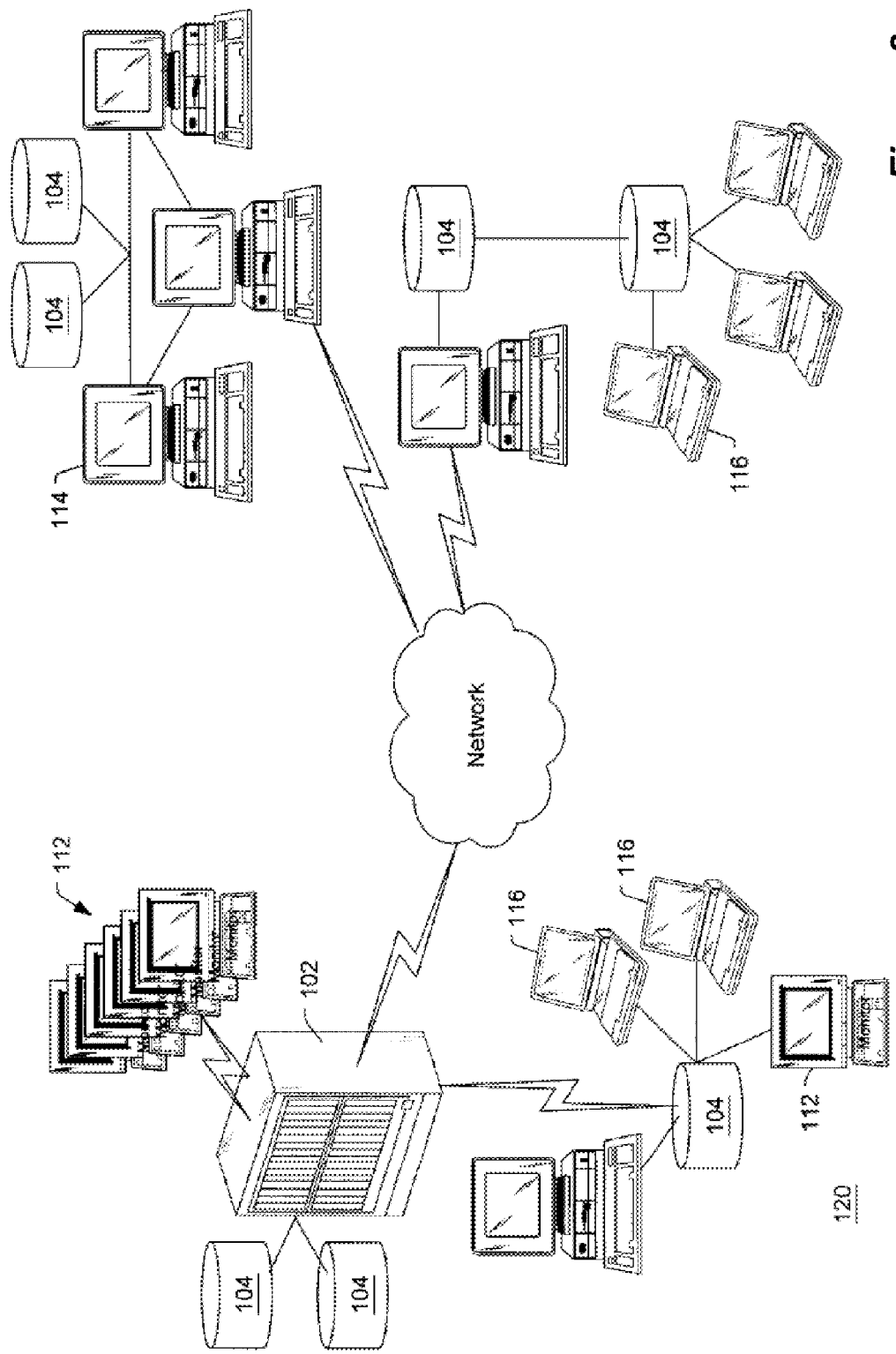
FIG. 8 shows an exemplary enterprise computing environment.

FIG. 8 illustrates an exemplary enterprise computing environment wherein one embodiment of the present invention may be installed. The Federated CMDB 30 may be installed and running on any of the computing endpoints in communication with the network shown in FIG. 8. As shown, the enterprise computing environment may include one or more computers, e.g., mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or part of the mainframe computer 102.

The mainframe computer system 102 may be coupled to one or more other computer systems and/or computer networks, including other mainframe computer systems. The mainframe computer system 102 may be coupled locally to a computer system network 120 in a local area network (LAN) configuration, or may be coupled to one or more computer systems and/or networks through a wide area network (WAN). As shown in FIG. 8, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 8, the mainframe computer 102 may also be coupled through a wide area network, represented by the "cloud" that is labeled "Network" in FIG. 8, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art, as well as a display device. In a similar manner, each of the desktop computer systems 114 and/or portable computer systems 116, or other computer systems comprised in the enterprise, comprise various standard computer components including one or more CPUs, one or more buses, memory, a power supply, non-volatile memory, and a display, such as a video monitor or LCD display. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. The database stored in the mainframe computer system 102 may be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, e.g., one or more of the file servers 104 may store its own database which is desired to be replicated among various of the other file servers and/or the mainframe computer system 102.

One or more of the computer systems 102, 112, 114, and 116 preferably include a memory medium on which computer programs according to the invention may be stored. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX® controls, C++ objects, Java® objects, Microsoft Foundation Classes (MFC), or other technologies or methodologies, as desired. (ACTIVEX is a registered trademark of the Microsoft Corporation. JAVA is a registered trademark of Sun Microsystems, Inc.) A computer system executing code and data from a memory medium comprises a means for graphically displaying database record organization according to the methods and/or block diagrams described herein.

Various embodiments further include receiving or storing instructions and/or data implemented in accordance with the foregoing description upon a carrier medium. Suitable carrier media include a memory medium as described below, as well as signals such as electrical, electromagnetic, or digital signals, conveyed via a communication medium such as networks 102 and/or 104 and/or a wireless link.

Figure 9:
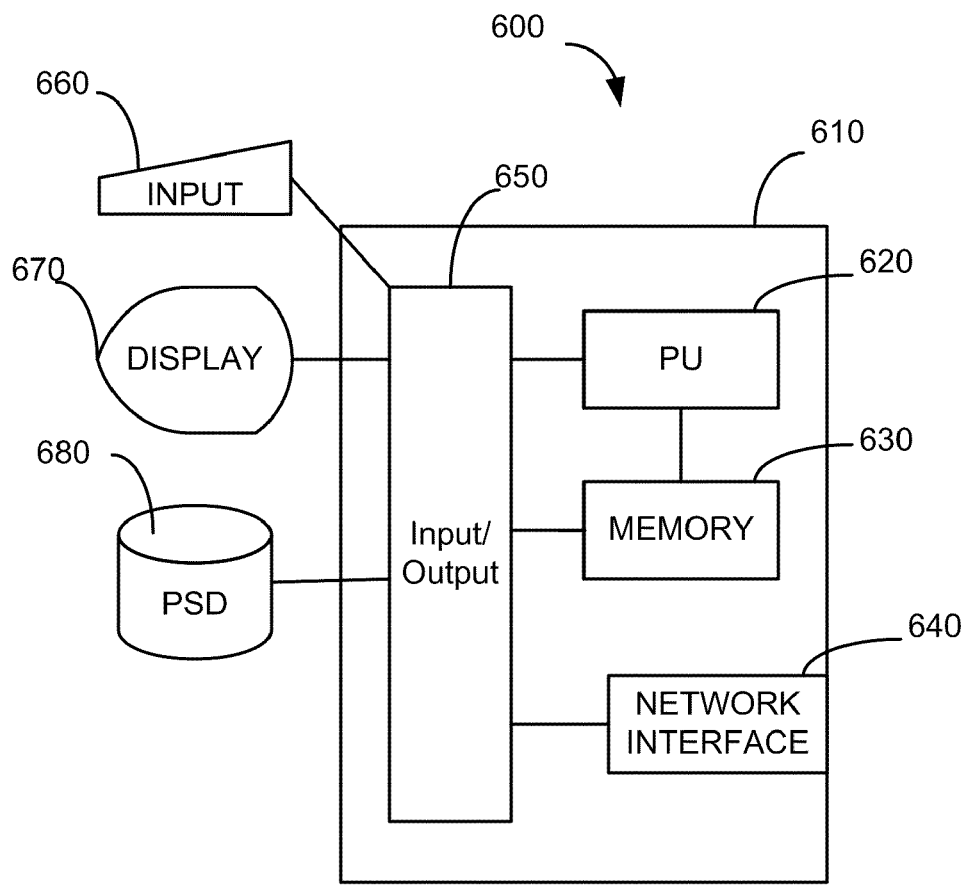
FIG. 9 shows, in block diagram form, an exemplary computer system comprising of a program control device.

Referring now to FIG. 9, an exemplary computer system 600 is shown. One or more exemplary computer systems 600 may be included in a mainframe computer (e.g., Element 102 in FIG. 8). Exemplary computer system 600 may comprise a programmable control device 610 which may be optionally connected to input 660 (e.g., a keyboard, mouse, touch screen, etc.), display 670 or program storage device (PSD) 680 (sometimes referred to as direct access storage device DASD). Also, included with program device 610 is a network interface 640 for communication via a network with other computing and corporate infrastructure devices (See FIG. 8). Note that network interface 640 may be included within programmable control device 610 or be external to programmable control device 610. In either case, programmable control device 610 will be communicatively coupled to network interface 640. Also note that program storage unit 680 represents any form of non-volatile storage including, but not limited to, all forms of optical and magnetic storage elements including solid-state storage.

Program control device 610 may be included in a computer system and be programmed to perform methods in accordance with this disclosure (e.g., those illustrated in FIGS. 3-4 and 6). Program control device 610 comprises a processor unit (PU) 620, input-output (I/O) interface 650 and memory 630. Processing unit 620 may include any programmable controller device including, for example, processors of an IBM mainframe (such as a quad-core z10 mainframe microprocessor). Alternatively, in non mainframe systems examples of processing unit 620 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 3-4 and 6 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 3-4 and 6 may be performed by an exemplary computer system 600 comprising a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium" or "computer useable medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. Also, XML was discussed in the embodiments disclosed herein. However, those of ordinary skill in the art will recognize that information may also be maintained as structured text, binary object data (e.g., binary data structures), HTML or other forms of storing data.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising a programmable control device programmed to perform a federated management data repository (MDR) query method for a configuration management database (CMDB), the method comprising:
    receiving interface information for one or more registered MDR services from a computer system possessing a Universal Description, Discovery and Integration (UDDI) registry;
    querying, by the CMDB, one or more of the registered MDR services for their respective MDR data models using a CMDBf compliant query interface;
    storing the queried MDR data models in a first memory;
    for each of the queried MDR data models:
        mapping one or more attributes from an entity in the MDR data model to one or more attributes of an entity or entities in the CMDB's federated data model; and
    registering, at the CMDB, an item within an MDR.

2. The computer system of claim 1, wherein the programmable control device is further programmed to store data representative of the attribute mappings in a second memory.

3. The computer system of claim 2, wherein the programmable control device is further programmed to:
    receive a query from a client application;
    federate data from one or more MDRs in response to the received query; and
    return a federated results set to the client application.

4. The computer system of claim 3, wherein the program to federate comprises a program to utilize a rules engine programmed to apply the stored mappings to the received query.

5. The computer system of claim 3, wherein the program to federate comprises a program to retrieve data from a plurality of MDRs.

6. The computer system of claim 5, wherein the program to retrieve further comprises a program utilizing one or more MDR services compliant with a CMDBf Standard.

7. The computer system of claim 1, wherein the programmable control device is further programmed to:
    receive a selection of one or more of the registered MDR services about which interface information was received,
    wherein the act of querying one or more of the registered MDR services for their respective MDR data models is limited to only the selected MDR services.

8. The computer system of claim 3, wherein the program to query is written by an administrator or an end-user.

9. The computer system of claim 1, wherein the program to map one or more attributes from an entity in the MDR data model to one or more attributes of an entity or entities in the CMDB's federated data model is specified by an administrator or an end-user via a user interface tool.

10. The computer system of claim 1, wherein the registering is initiated by the CMDB.

11. The computer system of claim 1, wherein the registering is initiated by the MDR.

12. A computer usable memory medium having computer readable program code embodied therein, wherein the computer readable program code is adapted to be executed to:
    receive interface information for one or more registered management data repository (MDR) services from a computer system possessing a Universal Description, Discovery and Integration (UDDI) registry;
    query, by a configuration management database (CMDB), one or more of the registered MDR services for their respective MDR data models using a CMDBf compliant query interface;

store the queried MDR data models in a first memory of the CMDB; and for each of the queried MDR data models:
store a mapping of one or more attributes from an entity in the MDR data model to one or more attributes of an entity or entities in the CMDB's federated data model in a second memory.

13. The computer usable memory medium of claim 12, wherein the computer readable program code is further adapted to be executed to:
receive a query from a client application;
federate data from one or more MDRs in response to the received query; and
return a federated results set to the client application.

14. The computer usable memory medium of claim 13, wherein the program to federate comprises a program utilizing a rules engine to apply the stored mappings to the received query.

15. The computer usable memory medium of claim 12, wherein the computer readable program code is further adapted to be executed to:
receive a selection of one or more of the registered MDR services about which interface information was received,
wherein the act of querying one or more of the registered MDR services for their respective MDR data models is limited to only the selected MDR services.

16. A federated query method, the method comprising:
receiving, at a first computer system, interface information for one or more registered management data repository (MDR) services from a computer system possessing a Universal Description, Discovery and Integration (UDDI) registry;
querying, by a configuration management database (CMDB), the one or more registered MDR services for their respective MDR data models using a CMDBf compliant query interface;
storing the queried MDR data models in a first memory of the first computer system; and
for each of the queried MDR data models:
storing, in a second memory of the first computer system, a mapping of one or more attributes of an entity in the MDR data model to one or more attributes of an entity or entities in the CMDB's federated data model.

17. The method of claim 16, further comprising:
receiving at the first computer a query from a client application;
federating data from one or more MDRs in response to the received query; and
returning a federated results set to the client application.

18. The method of claim 17, wherein the federating comprises utilizing a rules engine programmed to apply the stored mappings to the received query.

19. The method of claim 16, further comprising:
receiving a selection of one or more of the registered MDR services about which interface information was received,
wherein the act of querying one or more of the registered MDR services for their respective MDR data models is limited to only the selected MDR services.

20. The method of claim 16, further comprising the act of registering one or more items within an MDR at the CMDB, wherein the act of registration is initiated by the CMDB.

21. The method of claim 16, further comprising the act of registering one or more items within an MDR at the CMDB, wherein the act of registration is initiated by the MDR.

22. A computer network executing a federated management data repository (MDR) query method for a configuration management database (CMDB), the computer network comprising:
one or more non-volatile storage devices for maintaining enterprise configuration management information;
one or more computer systems communicatively coupled to the network, the one or more computer systems each configured to:
receive interface information for one or more registered management data repository (MDR) services from a computer system possessing a Universal Description, Discovery and Integration (UDDI) registry;
query the one or more registered MDR services for their respective MDR data models using a CMDBf compliant query interface;
store the queried MDR data models in a first memory; and
for each of the queried MDR data models:
store, in a second memory, a mapping of one or more attributes of an entity in the MDR data model to one or more attributes of an entity or entities in the CMDB's federated data model.

23. The computer network of claim 22, further comprising:
a plurality of MDRs; and
a plurality of MDR web services,
wherein each of the plurality of MDRs is associated with one or more MDR web services, and
wherein the plurality of MDR web services are configured to interface with the CMDB.

24. The computer network of claim 22, wherein the plurality of MDRs exist on a single computer system.

25. The computer network of claim 22, wherein the plurality of MDRs do not all exist on a single computer system.

26. The computer network of claim 22, further comprising a UDDI Registry, wherein the UDDI Registry is configured to be in communication with the CMDB.

27. The computer network of claim 22, further comprising a client application, wherein the client application is configured to query the CMDB.

* * * * *